J. L. CREVELING.
DYNAMO DRIVING MECHANISM.
APPLICATION FILED MAY 28, 1908.
1,139,493.
Patented May 18, 1915.
2 SHEETS—SHEET 1.
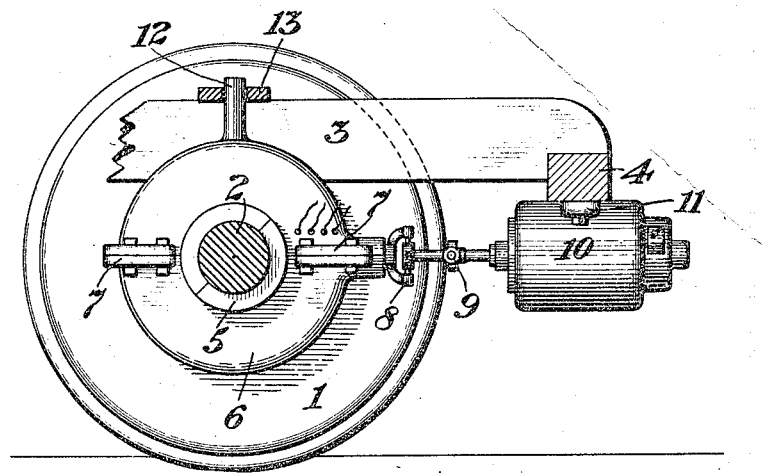
Fig. I

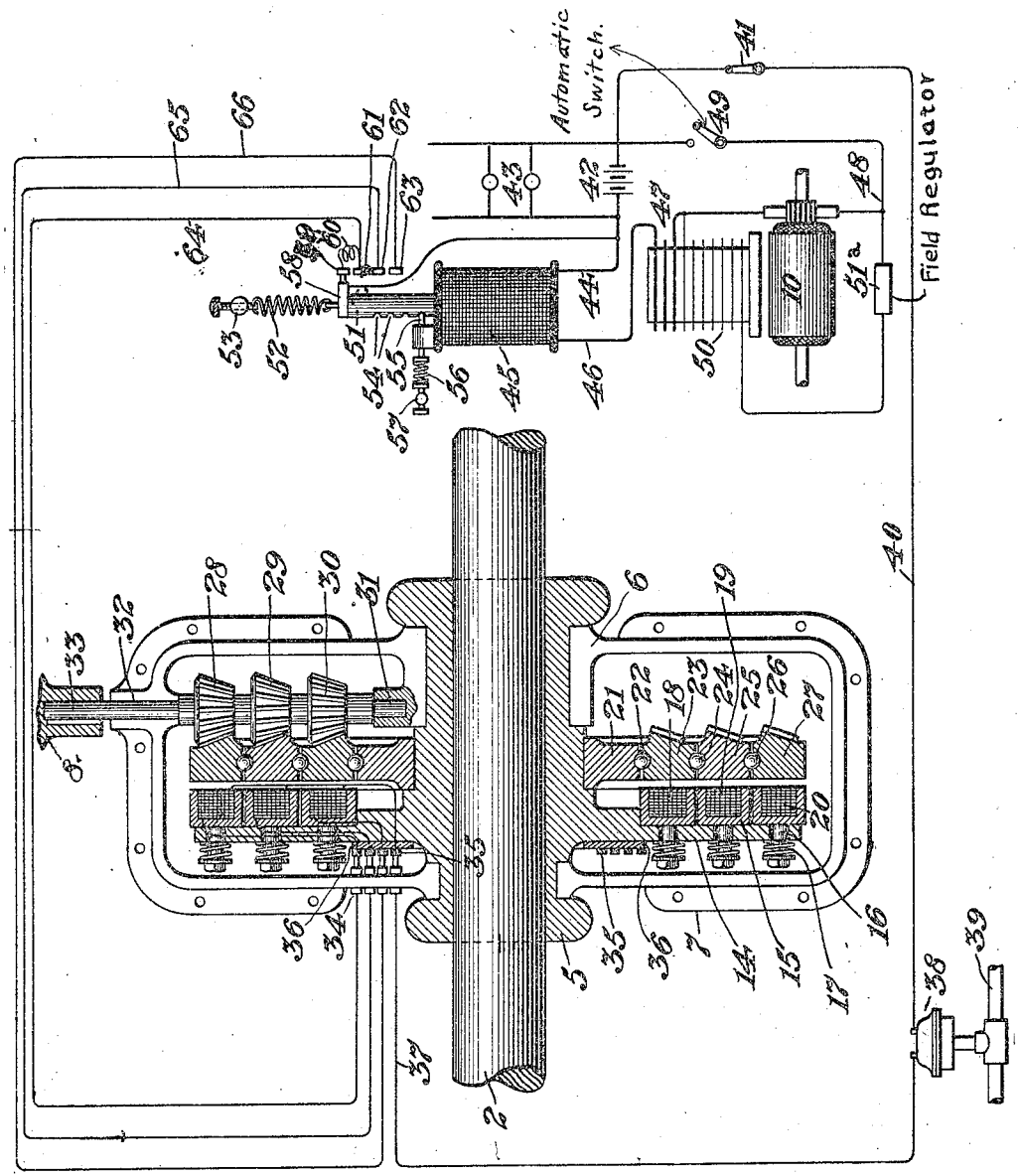

UNITED STATES PATENT OFFICE.

JOHN L. CREVELING, OF NEW YORK, N. Y., ASSIGNOR TO SAFETY CAR HEATING & LIGHTING COMPANY, A CORPORATION OF NEW JERSEY.

DYNAMO-DRIVING MECHANISM.

1,139,493.  Specification of Letters Patent.  Patented May 18, 1915.

Application filed May 28, 1908. Serial No. 435,379.

*To all whom it may concern:*

Be it known that I, JOHN L. CREVELING, of New York, of the county of New York and State of New York, have invented a certain new and useful Improvement in Dynamo-Driving Mechanism, as set forth in the annexed specification and drawing, forming a part thereof.

My invention pertains to that class of dynamo driving mechanism used to drive a dynamo placed upon a car or other moving vehicle by power derived from the motion of the vehicle.

My invention has for its particular object to provide means whereby the dynamo may be driven by gears without the intervention of a belt and at the same time be relieved of shocks or sudden strains to which it would be subjected if directly geared to the car axle. Also my invention comprehends means whereby the speed of the dynamo shall not increase as the velocity of the car or vehicle increases beyond certain limits as will hereinafter more plainly appear.

In the drawing Figure I represents a portion of the usual car truck and an elevation of my improved driving gear and generator. Fig. II is a sectional view of the driving mechanism and a diagrammatic representation of one way in which the same may be coupled up to coöperate with the generator and other apparatus as usually employed in a car lighting system of this class, comprehending storage batteries and lamps or other translating devices fed by the generator.

Like numerals are used to indicate like parts in the figures.

In Fig. I (1) represents the car wheel mounted upon the usual axle (2). (3) indicates the side sill of the truck carrying the end sill (4). (5) indicates a sleeve or bushing mounted upon the axle (2) so as to revolve therewith. (6) is a casing around the axle (2), inclosing the working parts of my improved driving gear and may be made in halves held together by flanges (7). (8) and (9) represent the coöperating members forming a universal joint between the driving mechanism and the generator (10) which may be suspended from the end sill (4) as by means of lugs (11). (12) represents a stud adapted to have vertical motion within the cross piece (13) which may be placed across the side sills in such manner as to prevent the shell (6) from rotating under normal working conditions.

In Fig. II it will be seen that the sleeve (5) is provided with a flange or expanded portion (14) upon which are mounted three annular concentric magnets (15) which are held against the flange (14) by the studs (16) and springs (17) in such manner as to revolve therewith and free to have a slight lateral displacement against the action of springs (17). These magnets are provided with windings (18), (19) and (20). The sleeve (5) also carries the annular steel member (21) provided with the ball bearing (22) engaging the annular gear (23) the periphery of which is provided with the ball bearing (24) engaging a like annular gear (25) carrying ball bearing (26) and the annular gear (27). (28) is a bevel gear engaging gear (27) while (29) is a gear engaging gear (25), and (30) is a like bevel gear engaging gear (23). These gears are fixed upon a shaft (33) supported in the bearings (31) and (32). (35) represents slip rings mounted upon the insulating member (36) and to which are connected the windings of the magnets (18), (19) and (20) as indicated while (34) indicates four brushes or wipers communicating with the four slip rings respectively.

The sleeve (5) and its flange (14) are made preferably of bronze or some other non-magnetic metal while the annular magnets (15) are made of iron or steel having high magnetic permeability and low retentivity.

The member (21) and gears (23), (25) and (27) are made of steel therefore if none of the magnets (15) be energized and the axle (2) be revolved the magnets will revolve with the same and remain otherwise in the position shown in the drawing as will also member (21) while the shaft (33) and gears (28), (29) and (30) and gears (23) (25) and (27) will remain stationary owing to the member (21) revolving in the bearing (22). If, however, one of the magnets (15) be energized it will move laterally over into frictional contact with the gear opposite it and cause this gear to revolve with it in a manner as will hereinafter be more fully explained.

The wire (37) leads from one of the brushes (34) to a pneumatic switch (38) in connection with the brake or signal system as by means of pipe (39). The function of this switch is to close the circuit therethrough when the car is attached to a locomotive and air pressure put upon its brake or signal line. Details of this switch are omitted inasmuch as its construction forms no part of my present invention and a good form of switch for this use is shown and described in Patent #688394 granted to me December 10, 1901.

From the opposite terminal of the switch (38) the wire (40) is led through the ordinary manually operated switch (41) to one side of the storage battery (42) with which are connected lamps or other translating devices as indicated at (43).

From the other pole of the battery is led the wire (44) through the solenoid (45) from which the wire (46) leads to one side of the differential winding (47) upon the generator (10) and thence to one brush of the said generator the other brush of which is connected as by wire (48) to one side of the automatic switch (49) the other side of which is connected to the storage battery and translating circuit.

The switch (49) may be any suitable type of switch adapted to automatically close the circuit when the voltage of the generator shall equal or slightly exceed that of the storage battery and to open the circuit when the voltage of the generator shall fall to equal or slightly less than that of the storage battery. Description of the construction of this switch is omitted inasmuch as the particular type of switch forms no part of my present invention and a switch suitable for this purpose may be found in Patent #707763 granted to me August 26, 1902.

The generator (10) is shown as provided with a field winding as indicated at (50) in circuit with which may be placed any type of regulator indicated at (51ª) which may be used to regulate the output of the generator for other refinements than accomplished by the speed changing devices comprehended in my present invention.

The solenoid (45) is provided with a core (51) supported by the spring (52) adjustable as by screw (53). The said core is provided with notches indicated at (54) which engage the member (55) which is pressed into them as by spring (56) adjustable as by screw (57). The core carries a contact member (58) which is in electrical connection with the storage battery as indicated.

The contact (58) is in connection with the engaging contact (59) when the solenoid (45) is not energized. If, however, the solenoid shall pull its core so as to cause it to move one notch (58) will be in electrical communication with the contact (61) and so on, with contacts (62) and (63) as will hereinafter more plainly appear.

The contact (59) is joined to the contact (61) by the resistance (60) while (61) communicates with one of the brushes (34) thence to the winding (20) by means of wire (64) while contact (62) communicates through wire (65) to one of the brushes (34) thence to the winding (19) and contact (63) is connected by wire (66) to one of the contacts (34) and thence to the winding (18), the other ends of windings (18), (19) and (20) being joined together and connected through one of the brushes (34) to the wire (37).

The operation of my improved driving gear is as follows: Referring to Fig. I, if the vehicle start to move wheel (1) will revolve together with the axle (2) and sleeve (5), while the engagement of the stud (12) with member (13) will prevent the case (6) from revolving. If the shaft carrying the members (8), and (9) be connected inside the case (6) so as to revolve, the armature of the generator (10) will rotate therewith. Either lateral or vertical play of the sills will be allowed within the limits of practice by design of stud (12) and the slot in the member (13) while the universal joint formed by (8) and (9) will take care of imperfect alinement in the generator connection due to such play. Further the member (13) or the member (12) may be so designed that excessive strain, due for instance, to the bearing of the shell (6) "setting" upon the sleeve (5) would cause either one of these members to give way and allow the entire case (6) to revolve with the axle provided the member (8) be attached to its shaft by a sleeve as indicated in Fig. II which also takes up play between the generator and the driving shaft. Now if during the movement of the vehicle as above mentioned the locomotive were attached air pressure would have been put upon the line (39) (see Fig. II) and the switch (38) would have been closed allowing the current from the storage battery to flow through contacts (58) and (59) resistance (60) wire (64) one of the brushes (34) through winding (20) to the returning brush (34) wire (37) switch (38) wire (40) switch (41) back to the battery, unless it were deemed desirable to cut out the transmitting gear altogether which could be readily done by opening switch (41). The current flowing through winding (20) as above described would cause its annular magnet (15) to move against the action of spring (17) and engage the gear (27) which in turn would revolve upon bearing (26) so as to revolve the driving gear (28) thereby rotating the shaft (33) and causing the generator armature to revolve. When sufficient speed has been reached that the switch (49) shall have closed current will flow from the generator (10) through the differential winding (47) solenoid (45) to the battery (42) thence back to the generator and when this shall have reached a predetermined value colenoid (45) will cause its core to be drawn down so that member (55) will engage the next notch and the resistance (60) will be cut out giving the predetermined full pressure upon the frictional contact surface of the magnet and the gear (27), enabling the same to carry the intended load without slipping. The function of the resistance (60) is to cut down the current taken from the storage battery when the car is coupled to the locomotive and switch (38) closed and the car moving so slowly that there is practically no load upon the driving gear other than driving the generator up to a point where it begins to pick up an appreciable load. Therefore this light contact between the friction members due to the weak current in the magnet prevents any excessive strain being put upon the gears in quickly jerking the car around as may be done before the train is brought up to any appreciable velocity, as in making up a train &c. If now the speed of the train increase until the generator shall have delivered a predetermined maximum current solenoid (45) will cause the core (51) to be pulled down another notch with a snap movement quickly throwing out magnet (20) and cutting in magnet (19) as may readily be seen by following out the circuit from contact (62). This will cause a change in speed which will cause some fall in the current delivered by the generator and this will be partly compensated for by the differential winding (47) and core (51) will remain in this position until the speed changes again to a certain limit owing to the engagement of member (55) in the slot as these members may be designed so as to allow proper margin between such speed changes. If the speed of the car increases still further until the generator shall reach a predetermined maximum the core of the solenoid will move down another notch cutting out magnet (19) and cutting in magnet (18) thereby driving gear (30) by the small gear (23). By proper design this can be made to cut in at such speed that no further increase in speed is possible which may not readily be taken care of by the generator as for instance by the differential winding (47) or regulator (51ᵃ). Now if the train slow down the reverse operation will be gone through in a manner easily comprehended from the above.

From the above it will be plain that if at any time the generator should be over loaded slip between the magnet and its gear may take place and if at any time the armature should be mechanically bound, as for instance its journals heated, as soon as it shall slow down it will of course lessen the current in solenoid (45) and allow the core to move back and insert the resistance (60) causing lightest pressure between the friction members.

I do not wish in any way to limit myself to the exact design or construction of any of the devices shown in this application and drawing which devices are merely chosen as forms embodying my invention, and it is obvious that wide departure may be made in details of such devices without departing from the spirit of my invention, which is as set forth in the following claims:

I claim—

1. The combination with a car truck provided with an axle, of a generator mounted upon the truck, a driving gear mounted upon the axle and means operatively connecting said driving gear with said axle, of means for preventing a portion of said driving gear from revolving with said axle under normal operating conditions and adapted to allow the same to revolve when subjected to excessive strain and means whereby such revolution effects disengagement with the generator without injury to the same.

2. The combination with an axle and a generator, of means for operatively connecting the axle with said generator, comprising a gear operatively connected with said axle, a gear meshed with the first named gear, means for holding said gears in operative relation to each other, means operatively connecting said gears with the generator, means for normally preventing the holding means from revolving and means for permitting disengagement of the generator upon revolution of said holding means.

3. The combination with a car axle and a generator of means for operatively connecting the axle with said generator comprehending a gear driven by said axle, a gear driven by said first named gear, means for holding said gears in operative relation to each other, means for normally preventing said holding means from revolving with said axle, means for yieldingly connecting the dynamo in operative relation with the second named gear comprehending connecting means permitting disengagement upon revolution of the holding means.

4. The combination with a car axle and a generator, of means for operatively connecting said axle and generator, comprising a gear carried by said axle and revolving therewith, a gear meshed with said first named gear, a housing surrounding the first named gear and carrying the second named gear in operative relation thereto, means for normally preventing revolution of said housing, means for operatively connecting the second named gear with the said generator and readily permitting disengagement without injury to either upon revolution of said housing.

5. The combination with a car axle and a generator having its shaft at a right angle with said axle, of means for driving the said generator comprehending a bevel gear carried upon the said axle, a bevel gear engaging said first named gear and provided with a shaft at a right angle with said axle, means for holding the gears in operative relation to each other, means for preventing said holding means from revolving with said axle, means for connecting the second named gear with the generator comprehending a universal joint and a slip joint adapted to disengage the holding means upon revolution of the latter.

6. The combination with a car axle and a generator, of a driving element carried by the axle comprising a rotating member deriving its motion from the rotation of the axle and stationary means for holding said rotating member in a fixed position with regard to said axle, means for operatively connecting the generator and said driven member comprising connecting means adapted to disengage the stationary means upon revolution of the latter.

7. The combination with a car axle and a generator of a gear carried by the axle, a second gear meshed therewith, means carried by the said axle for holding said gears in operative relation with each other, a journal for said first named gear and means for preventing said gear from revolving upon said journal.

8. The combination with a car axle, of a sleeve mounted thereon, a bevel gear revolubly mounted upon said sleeve, means for causing the bevel gear to revolve with said sleeve, a bevel gear driven by the first named gear and provided with a shaft at substantially right angles to the axle, a housing surrounding said gears and holding the same in operative relation, means for normally preventing said housing from revolving with the axle, means for operatively connecting the gear shaft with the generator comprising driving means readily capable of disengagement with said driven shaft upon revolution of the housing.

9. The combination with a car axle, a gear carried by the same, a generator provided with an armature having a shaft at right angles to said axle, a gear engaging said shaft and the gear upon the axle and clutch mechanism intervening between said first mentioned gear and the said axle, whereby said gear may be driven from the said axle and disengaged therefrom.

10. The combination with a car provided with a substantially transverse axle, of a gear carried upon said axle and adapted to be driven thereby, a supporting member carried upon said axle, a shaft carried by said supporting member, a gear operatively engaging said shaft and the first named gear whereby said shaft is driven by motion of said axle, a generator provided with a shaft placed longitudinally with respect to said car and carried upon said car, driving means operatively connecting the driven shaft carried by said supporting member and the generator shaft, comprehending means for allowing approach and recession between the generator and the axle and changes in alinement between the generator and the axle combined with clutch mechanism effecting operative engagement between the first mentioned gear and the axle.

JOHN L. CREVELING.

Witnesses:
C. J. STOCKLEY,
E. E. ALLBEE.